US011919742B2

United States Patent
Halingale et al.

(10) Patent No.: US 11,919,742 B2
(45) Date of Patent: Mar. 5, 2024

(54) MOBILE CAR OPERATING PANEL

(71) Applicant: Otis Elevator Company, Farmington, CT (US)

(72) Inventors: Paras Kumar Halingale, Hyderabad (IN); Sameer Shamkant Dixit, Maharashtra (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1296 days.

(21) Appl. No.: 16/444,075

(22) Filed: Jun. 18, 2019

(65) Prior Publication Data
US 2019/0382236 A1 Dec. 19, 2019

(30) Foreign Application Priority Data
Jun. 19, 2018 (IN) .............................. 201811022839

(51) Int. Cl.
*B66B 1/52* (2006.01)
*B66B 1/46* (2006.01)
(Continued)

(52) U.S. Cl.
CPC ................ *B66B 1/468* (2013.01); *B66B 1/52* (2013.01); *H04W 12/63* (2021.01); *H04W 76/10* (2018.02);
(Continued)

(58) Field of Classification Search
CPC ............ B66B 1/468; B66B 2201/4653; B66B 1/3461; B66B 3/00; B66B 2201/4638;
(Continued)

(56) References Cited

U.S. PATENT DOCUMENTS 5,832,363 A 11/1998 Moriya et al.
7,500,544 B2 3/2009 Hakala et al.
(Continued)

FOREIGN PATENT DOCUMENTS

CN 201737545 2/2011
CN 104016199 9/2014
(Continued)

OTHER PUBLICATIONS

EP Application No. 19181170.2 Extended EP Search Report dated Apr. 29, 2020, 7 pags.
(Continued)

*Primary Examiner* — Marlon T Fletcher
(74) *Attorney, Agent, or Firm* — CANTOR COLBURN LLP

(57) ABSTRACT

A method of providing a mobile car operating panel system includes establishing communication between a mobile device and a mobile wireless access point associated with a car operating panel within an elevator car. A user interface provided on the mobile device is operable to command the car operating panel through the mobile wireless access point. A proximity between the mobile device and the car operating panel is determined. A car call is registered to command a stop landing of the elevator car based on verifying the proximity of the mobile device to the car operating panel within a threshold distance and an input through the user interface on the mobile device indicating the stop landing.

20 Claims, 5 Drawing Sheets

(51) Int. Cl.
*H04W 12/63* (2021.01)
*H04W 76/10* (2018.01)
*H04W 88/08* (2009.01)

(52) U.S. Cl.
CPC ..... *B66B 2201/4653* (2013.01); *H04W 88/08* (2013.01)

(58) Field of Classification Search
CPC ....... B66B 1/3415; B66B 1/3446; B66B 1/52; B66B 2201/101; B66B 2201/4607
See application file for complete search history.

(56) References Cited

U.S. PATENT DOCUMENTS

| | | | |
|---|---|---|---|
| 9,878,875 B1 | 1/2018 | Scoville et al. | |
| 10,691,397 B1* | 6/2020 | Clements | G06F 3/0484 |
| 10,766,737 B2* | 9/2020 | Salmikuukka | B66B 1/468 |
| 2016/0311647 A1 | 10/2016 | Peterson et al. | |
| 2017/0174473 A1 | 6/2017 | Simcik | |
| 2017/0240379 A1 | 8/2017 | Simcik et al. | |
| 2017/0349402 A1 | 12/2017 | Chapman et al. | |
| 2018/0346282 A1* | 12/2018 | Simcik | B66B 1/468 |
| 2019/0106290 A1 | 4/2019 | Chapman et al. | |

FOREIGN PATENT DOCUMENTS

| | | | | | |
|---|---|---|---|---|---|
| CN | 105016151 A | | 11/2015 | | |
| CN | 205855656 | | 1/2017 | | |
| CN | 107572318 | | 1/2018 | | |
| CN | 108016956 A | * | 5/2018 | ........... | B66B 1/3461 |
| CN | 109071152 A | * | 12/2018 | ........... | B66B 1/2408 |
| CN | 109789986 A | * | 5/2019 | ........... | B66B 1/468 |
| CN | 109969878 A | * | 7/2019 | ........... | B66B 1/28 |
| CN | 110203781 A | * | 9/2019 | ........... | B66B 1/06 |
| CN | 110228733 A | * | 9/2019 | ........... | B66B 1/14 |
| CN | 110228734 A | * | 9/2019 | ........... | B66B 1/14 |
| CN | 110294372 A | * | 10/2019 | ........... | B66B 1/14 |
| CN | 110467070 A | * | 11/2019 | ........... | B66B 1/3461 |
| DE | 102009049268 A1 | | 4/2011 | | |
| EP | 3231754 A1 | * | 10/2017 | ........... | B66B 1/14 |
| EP | 3312123 A1 | * | 4/2018 | | |
| EP | 3312123 A1 | | 4/2018 | | |
| EP | 3536646 A1 | | 9/2019 | | |
| ES | 2925530 T3 | * | 10/2022 | ........... | B66B 1/14 |
| SG | 2013006127 A1 | | 8/2014 | | |
| WO | 2011102654 A2 | | 8/2011 | | |
| WO | 2014178790 A1 | | 11/2014 | | |

OTHER PUBLICATIONS

CN Application No. 201910525905.3 First Office Action dated Apr. 16, 2021 with English Translation, 19 pages.

EP Application No. 19181170.2 Office Action dated Oct. 18, 2021, 5 pages.

\* cited by examiner

MOBILE CAR OPERATING PANEL

FOREIGN PRIORITY

This application claims priority to India Patent Application No. 201811022839 filed Jun. 19, 2018, and all the benefits accruing therefrom under 35 U.S.C. § 119, the contents of which in its entirety are herein incorporated by reference.

BACKGROUND

The embodiments herein relate to elevator systems, and more particularly to a mobile car operating panel of an elevator system.

An elevator car in an elevator system typically includes one or more operating panels on at least one interior wall of the elevator car to command various elevator car actions. Each car operating panel can include a plurality of push buttons or other interfaces that allow occupants of the elevator car to select one or more landings for the elevator car to stop at while traveling in an elevator shaft. Car operating panels can also include buttons or switches for other operations, such as door closing, door opening, stopping elevator car travel, emergency call initiation, and the like. Car operating panels may further include status information indicators, such as a current landing position (e.g., a floor number), a direction of travel, an indication of landings selected for stopping at during travel, and/or other status information.

In larger elevator cars, it can be challenging for occupants to reach a car operating panel during periods of high occupancy when crowds may limit accessibility to the car operating panel. Occupants may request that someone standing close to the car operating panel press a desired landing call button, but car operating panel visibility may be blocked thereby preventing the requester from confirming that another occupant pressed the desired landing call button as requested.

BRIEF SUMMARY

According to an embodiment, a method of providing a mobile car operating panel system includes establishing communication between a mobile device and a mobile wireless access point associated with a car operating panel within an elevator car. A user interface provided on the mobile device is operable to command the car operating panel through the mobile wireless access point. A proximity between the mobile device and the car operating panel is determined. A car call is registered to command a stop landing of the elevator car based on verifying the proximity of the mobile device to the car operating panel within a threshold distance and an input through the user interface on the mobile device indicating the stop landing.

In addition to one or more of the features described herein, or as an alternative, further embodiments include where the proximity between the mobile device and the car operating panel is determined based on a signal strength between the mobile device and the car operating panel.

In addition to one or more of the features described herein, or as an alternative, further embodiments include where the proximity between the mobile device and the car operating panel is determined based on tracking movement of the mobile device within the elevator car.

In addition to one or more of the features described herein, or as an alternative, further embodiments include disabling communication between the mobile device and the car operating panel based on determining that the mobile device is external to the elevator car.

In addition to one or more of the features described herein, or as an alternative, further embodiments include where the proximity between the mobile device and the car operating panel is determined based on a beacon operably coupled to the mobile wireless access point and configured to communicate with the mobile device.

In addition to one or more of the features described herein, or as an alternative, further embodiments include where the proximity between the mobile device and the car operating panel is determined based on a triangulation between the mobile device, the car operating panel, and at least one more wireless communication source.

In addition to one or more of the features described herein, or as an alternative, further embodiments include where the at least one more wireless communication source comprises another instance of the car operating panel within the elevator car.

In addition to one or more of the features described herein, or as an alternative, further embodiments include where the at least one more wireless communication source includes a beacon operably coupled to the mobile wireless access point and configured to communicate with the mobile device.

In addition to one or more of the features described herein, or as an alternative, further embodiments include where the user interface on the mobile device is operable to receive one or more car operating panel commands, transmit the one or more car operating panel commands to the car operating panel, and display status information received from the car operating panel.

In addition to one or more of the features described herein, or as an alternative, further embodiments include where communication between the mobile device and the mobile wireless access point comprises local wireless communication within a wireless communication range of the mobile device and the mobile wireless access point.

According to an embodiment, a system includes a car operating panel in an elevator car, the car operating panel operable to control a plurality of actions of the elevator car. The system also includes a mobile wireless access point operably coupled to the car operating panel. The mobile wireless access point includes a short-range communication module and a controller configured to perform: establishing communication between a mobile device and the mobile wireless access point through the short-range communication module, determining a proximity between the mobile device and the car operating panel, and registering a car call to command a stop landing of the elevator car based on verifying the proximity of the mobile device to the car operating panel within a threshold distance and an input through the mobile device indicating the stop landing.

According to an embodiment, a method includes establishing communication between a mobile device and a mobile wireless access point associated with a car operating panel within an elevator car, and receiving one or more car operating panel commands at a user interface of the mobile device. The method also includes transmitting the one or more car operating panel commands to the car operating panel through the mobile wireless access point, and displaying status information on the user interface based on data received from the car operating panel through the mobile wireless access point.

Technical effects of embodiments of the present disclosure include providing a mobile device user interface that is active within an elevator car to enable control and/or observation of a car operating panel through a mobile device.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
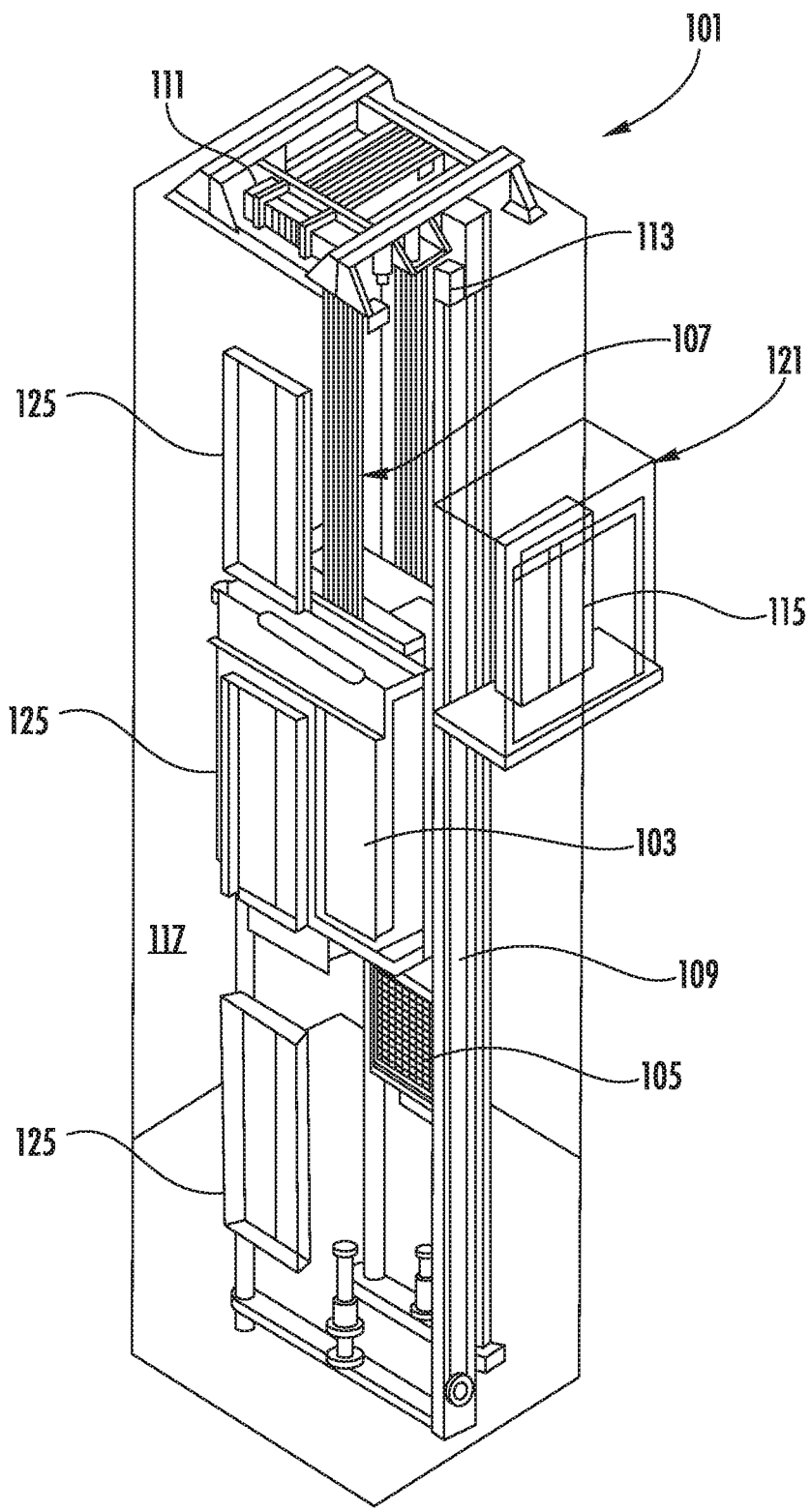
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
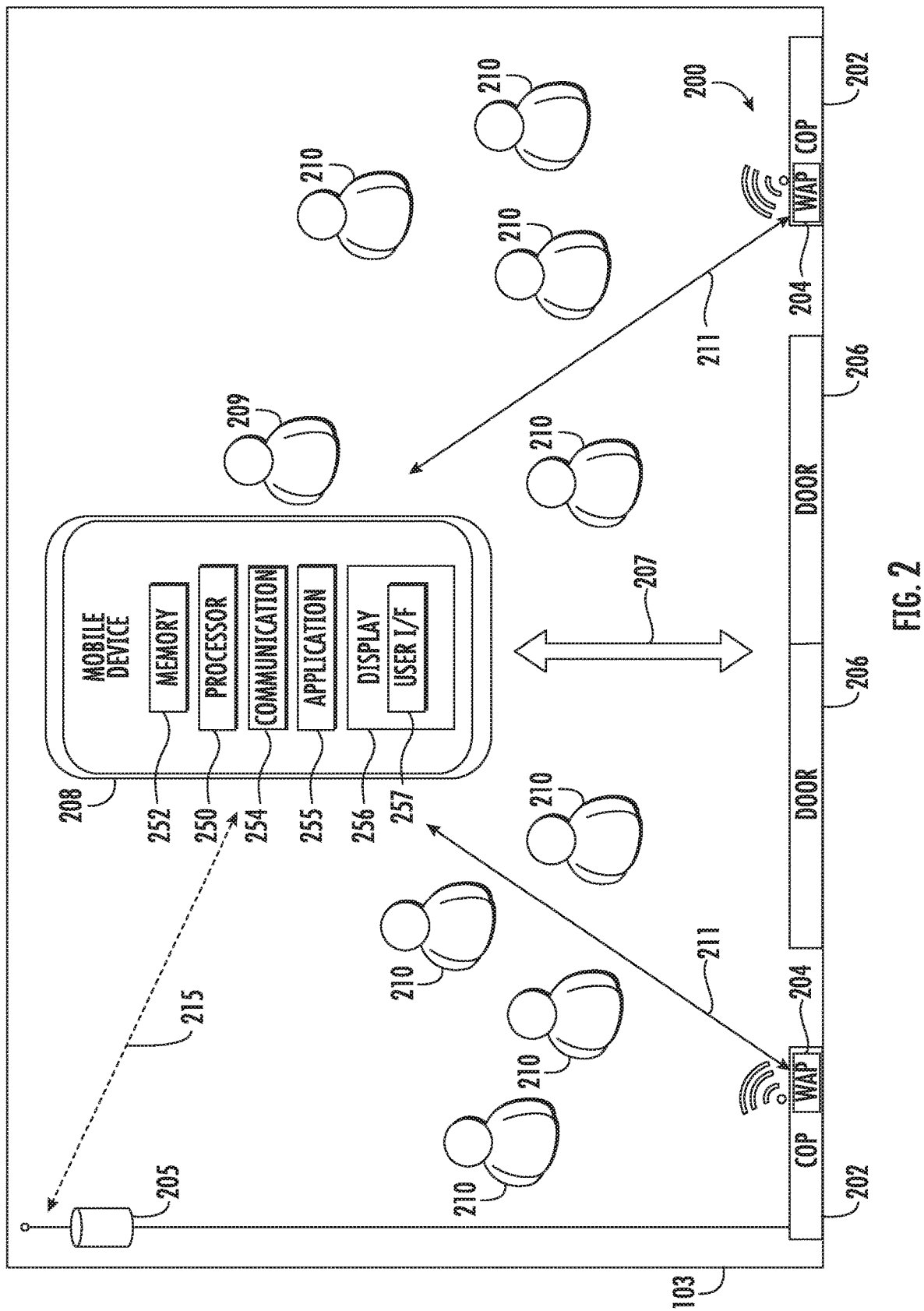
FIG. 2 is a schematic illustration of a mobile car operating panel system for the elevator system of FIG. 1, in accordance with an embodiment of the disclosure.

As shown in FIG. 2, a mobile car operating panel system 200 for the elevator system 101 of FIG. 1 can be incorporated in at least one elevator car 103. The mobile car operating panel system 200 can include one or more car operating panels 202 operably coupled to a mobile wireless access point 204. In the example of FIG. 2, the elevator car 103 includes a pair of car operating panels 202 each having a corresponding mobile wireless access point 204. In alternate embodiments, there can be a single instance of the car operating panel 202 and/or the mobile wireless access point 204 in the elevator car 103. The car operating panels 202 and mobile wireless access points 204 are configured to move up and down throughout the elevator shaft 117 with the elevator car 103.

Also shown in FIG. 2 is a mobile device 208. The mobile device 208 may be a mobile computing device that is typically carried by a person (e.g., a mobile device user 209), such as, for example a smart phone, PDA, smart watch, tablet, laptop, etc. The mobile device 208 may include a processor 250, memory 252, a communication module 254, and a display 256 as shown in FIG. 2. The processor 250 can be any type or combination of computer processors, such as a microprocessor, microcontroller, digital signal processor, application specific integrated circuit, programmable logic device, and/or field programmable gate array. The memory 252 is an example of a non-transitory computer readable storage medium tangibly embodied in the mobile device 208 including executable instructions stored therein, for instance, as firmware. The communication module 254 may implement one or more communication protocols as described in further detail herein. The mobile device 208 may belong to the mobile device user 209 who currently has access to the elevator car 103. An application 255 stored in the memory 252 can execute on the processor 250 to provide a user interface 257 on the display 256. The communication module 254 can establish communication with the mobile wireless access point 204 to enable the mobile device user 209 to send commands and receive status of the car operating panel 202 through the user interface 257. In some embodiments, the display 256 can be a touchscreen configured to receive input from the user 209.

The mobile device user 209 of the mobile device 208 may transmit car calls through the application 255 as if directly pressing one or more physical buttons on the car operating panel 202. In an embodiment, once the application 255 is installed on the mobile device 208, the application 255 may be enabled to operate as the mobile device user 209 moves the mobile device 208 through doors 206 onto the elevator car 103. Movement 207 of the mobile device 208 within the elevator car 103 can be tracked to confirm the commands are only accepted from an instance of the mobile device 208 that is within the elevator car 103. When the mobile device user 209 is blocked or obstructed from being able to physically access or view the car operating panel 202 by a plurality of elevator car occupants 210, the application 255 on the mobile device 208 may enable the mobile device user 209 to command a stop landing of the elevator car 103 at a desired landing 125 and/or observe current selections/status information that is typically visible on the car operating panel 202. In some embodiments, the application 255 provides additional status information and/or commands beyond that available directly through the car operating panel 202.

The mobile device 208 and the mobile wireless access point 204 are operable to communicate with one another. For example, the mobile device 208 and the mobile wireless access point 204 may communicate with one another when proximate to one another (e.g., within a threshold distance). The mobile device 208 and the mobile wireless access point 204 may communicate over a wireless network, such as 802.11x (Wi-Fi), ZigBee, Z-Wave and short-range radio (Bluetooth).

A location of the mobile device 208 may be determined using various technologies including GPS, triangulation, trilateration, signal strength detection, accelerometer detection, gyroscopic detection, or other known techniques by way of non-limiting example. The triangulation and trilateration may use various wireless technologies including but not limited to Wi-Fi and Bluetooth. In example embodiments, the mobile device 208 communicates with the mobile wireless access point 204 over multiple independent wireless networks. Proximity between the mobile wireless access point 204 and mobile device 208 can be determined based on signal strength directly and/or through one or more other wireless communication sources, such as a beacon 205.

In a non-limiting example, beacon 205 can be a wireless signal beacon (e.g., Bluetooth), that the mobile device 208 can detect when it is in proximity of the beacon 205, then the mobile device 208 can communicate with the mobile wireless access point 204 within the elevator car 103. Although one beacon 205 is shown in FIG. 2, it is understood that any number of beacons 205 may be used in the elevator car 103. In an embodiment, the mobile wireless access point 204 and/or the beacon 205 may include a Wi-Fi transceiver to connect to a mobile device 208 when the mobile device 208 enters/exits the elevator car 103 in order to identify/locate the mobile device 208. In another embodiment, the mobile wireless access point 204 and/or beacon 205 may include a Bluetooth transceiver to connect to a mobile device 208 when the mobile device 208 enters/exits the elevator car 103 in order to identify/locate the mobile device 208. The mobile wireless access point 204 and/or the beacon 205 can be configured to detect a distance between the mobile wireless access point 204 and/or the beacon 205 (e.g., distances 211, 215) and the mobile device 208 and monitor the distance for a selected period of time to determine whether the mobile device 208 is entering and/or leaving the elevator car 103 through the doors 206.

Communication between the mobile device 208 and the mobile wireless access point 204 and/or the beacon 205 can be one-way or two-way communication. In one example, if Bluetooth is utilized then the mobile device 208 may advertise a Bluetooth signal and the mobile wireless access point 204 and/or the beacon 205 may receive it. In another example, the mobile wireless access point 204 and/or the beacon 205 may advertise a Bluetooth signal and the mobile device 208 may receive it. In another example, there may be two-way Bluetooth communication between the mobile device 208 and the mobile wireless access point 204 and/or the beacon 205. In another example, a Wi-Fi transceiver (i.e., beacon 205) may be placed in the elevator car 103, and the mobile device 208 may detect the Wi-Fi beacon frame as part of the 802.11x protocol as well as the received signal strength of that beacon frame to approximate the distance between the Wi-Fi transceiver and the mobile device 208 but not connect to the Wi-Fi signal. In another example, the mobile device 208 may actively send a probe request looking for Wi-Fi transceivers, then a Wi-Fi transceiver (i.e., beacon 205) located in an elevator car 103 may extract the MAC address of the mobile device 208 from the probe request and approximate distance between the Wi-Fi transceiver and the mobile device 208 from received signal strength. Although only a single instance of the mobile device 208 is depicted in FIG. 2, there can be multiple mobile device users 209 at different positions within the elevator car 103 each having a different instance of the mobile device 208.

Figure 3:
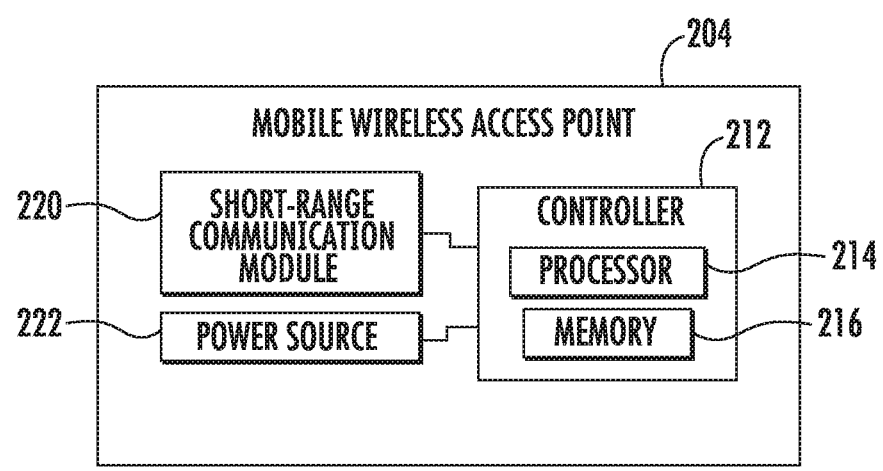
FIG. 3 is a schematic illustration of a mobile wireless access point of the mobile car operating panel system of FIG. 2, in accordance with an embodiment of the disclosure.

FIG. 3 illustrates a block diagram of the mobile wireless access point 204. It should be appreciated that, although particular systems are separately defined in the schematic block diagram of FIG. 3, each or any of the systems may be otherwise combined or separated via hardware and/or software. As shown in FIG. 3, the mobile wireless access point 204 may include a controller 212, a short-range communication module 220 in communication with the controller 212, and a power source 222 electrically connected to the controller 212.

The controller 212 of the mobile wireless access point 204 includes a processor 214 and an associated memory 216 including computer-executable instructions that, when executed by the processor 214, cause the processor 214 to perform various operations, such as, for example, translating commands from the mobile device 208 of FIG. 2 into commands for the car operating panel 202 of FIG. 2. The processor 214 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 216 may be a storage device, such as, for example, a random access memory (RAM), read only memory (ROM), or other electronic, optical, magnetic or any other computer readable medium.

The power source 222 of the mobile wireless access point 204 is configured to store and supply electrical power to the mobile wireless access point 204. The power source 222 may include an energy storage system, such as, for example, a battery system, capacitor, or other energy storage system known to one of skill in the art. The power source 222 may also generate electrical power for the mobile wireless access point 204. The power source 222 may also include an energy generation or electricity harvesting system, such as, for example synchronous generator, induction generator, or other type of electrical generator known to one of skill in the art.

The mobile wireless access point 204 includes a short-range communication module 220 located within the mobile wireless access point 204. The short-range communication module 220 is configured to allow the controller 212 of the mobile wireless access point 204 to communicate with the mobile device 208, other mobile wireless access points 204, and/or the beacon 205 through one or more short-range wireless protocols.

Figure 4:
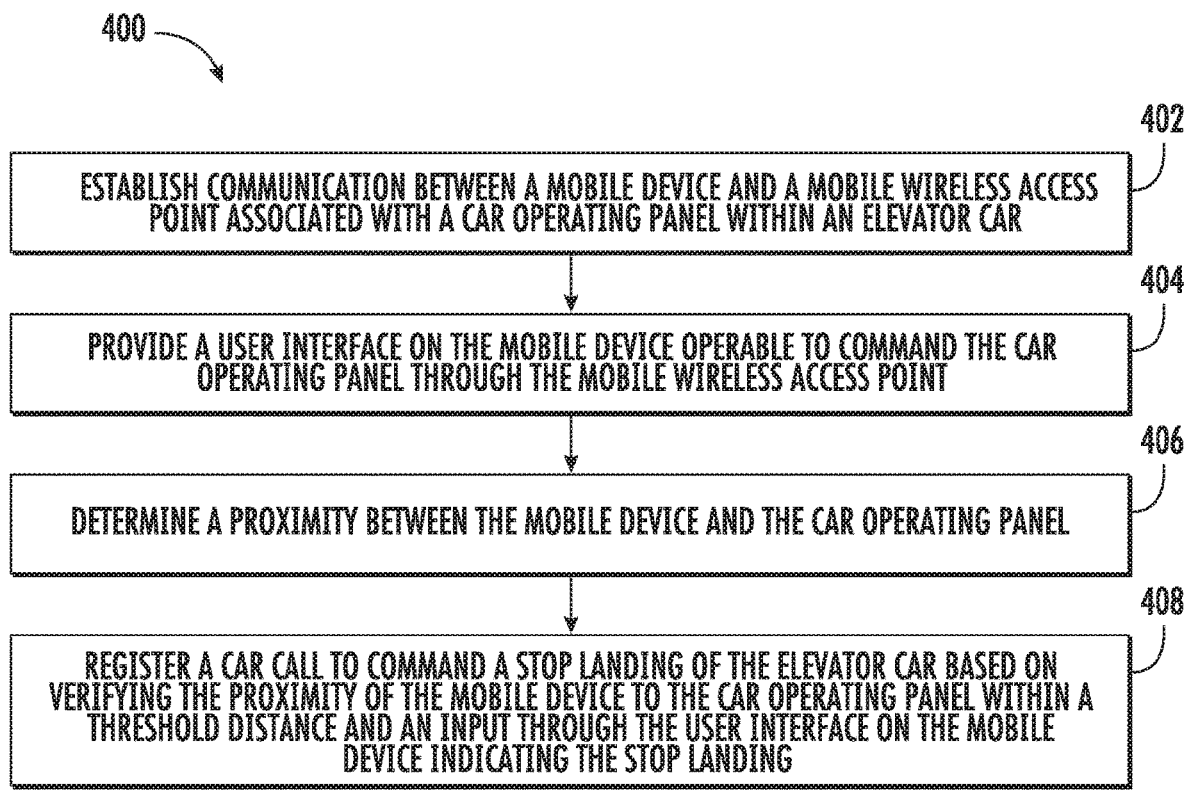
FIG. 4 is a flow chart of a method in accordance with an embodiment of the disclosure.

Referring now to FIG. 4, while referencing components of FIGS. 1-3, FIG. 4 shows a flow chart of a method 400 in accordance with an embodiment of the disclosure. At block 402, communication is established between a mobile device 208 and a mobile wireless access point 204 associated with a car operating panel 202 within an elevator car 103. Communication between the mobile device 208 and the mobile wireless access point 204 can include local wireless communication within a wireless communication range of the mobile device 208 and the mobile wireless access point 204.

At block 404, a user interface 257 is provided on the mobile device 208 operable to command the car operating panel 202 through the mobile wireless access point 204. The user interface 257 can be provided on the display 256 of the mobile device 208 by application 255. The user interface 257 may provide limited commands that are only available while the mobile device 208 is within the elevator car 103. In some embodiments, the user interface 257 may mirror the current state of the car operating panel 202.

At block 406, proximity between the mobile device 208 and the car operating panel 202 can be determined by the mobile wireless access point 204 or other component of the mobile car operating panel system 200. The proximity between the mobile device 208 and the car operating panel 202 can be determined based on the signal strength between the mobile device 208 and the car operating panel 202. The exact distance need not be known, as signal strength can be used as a proximity indicator. The proximity between the mobile device 208 and the car operating panel 202 can be determined based on tracking movement 207 of the mobile device 208 within the elevator car 103. In some embodiments, communication between the mobile device 208 and the car operating panel 202 can be disabled based on determining that the mobile device 208 is external to the elevator car 103. The proximity between the mobile device 208 and the car operating panel 202 can be determined based on a beacon 205 operably coupled to the mobile wireless access point 204 and configured to communicate with the mobile device 208. Further, the proximity between the mobile device 208 and the car operating panel 202 is determined based on a triangulation between the mobile device 208, the car operating panel 202, and at least one more wireless communication source. The at least one more wireless communication source can include another instance of the car operating panel 202 within the elevator car 103 and/or a beacon 205 operably coupled to the mobile wireless access point 204 and configured to communicate with the mobile device 208. For instance, signal strength between one instance of the mobile wireless access point 204 and the mobile device 208 and be compared relative to the signal strength between a second instance of the mobile wireless access point 204 and the mobile device 208 and further tracked during movement of the mobile device 208 to confirm a location within the elevator car 103.

At block 408, a car call to command a stop landing of the elevator car 103 can be registered for commanding the car operating panel 202 based on verifying the proximity of the mobile device 208 to the car operating panel 202 within a threshold distance and an input through the user interface 257 on the mobile device 208 indicating the stop landing (e.g., selection of a desired destination floor by the mobile device user 209).

Figure 5:
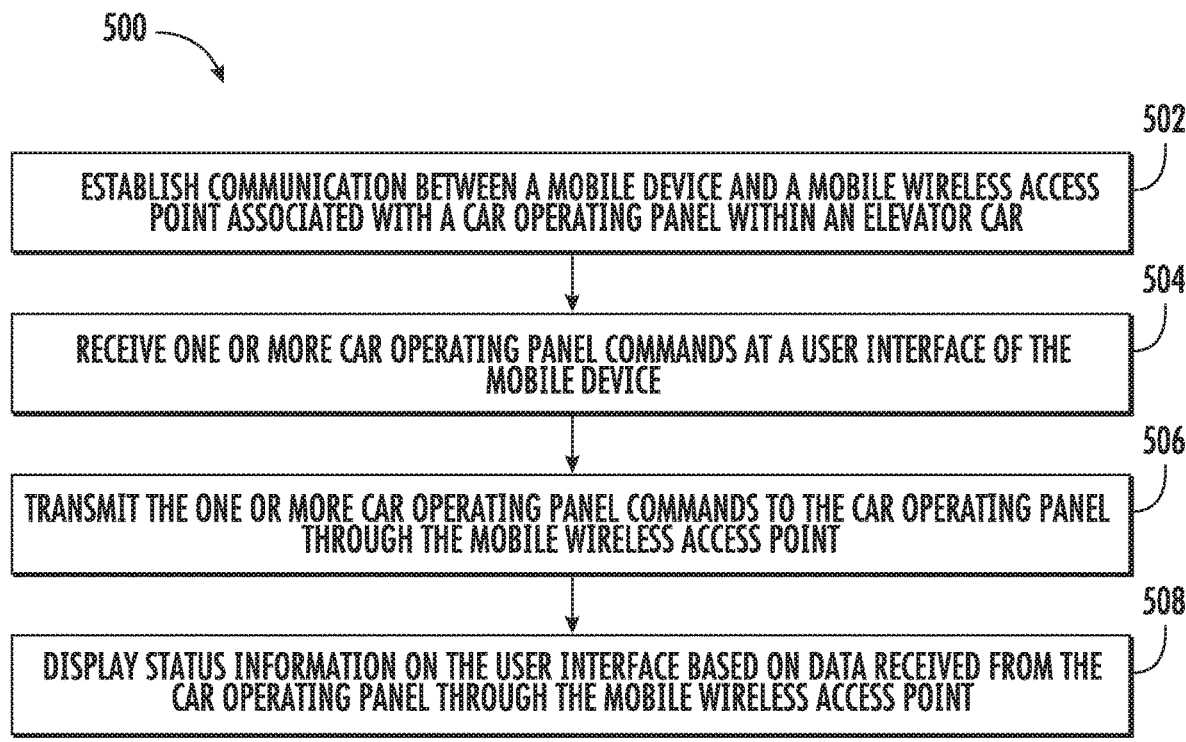
FIG. 5 is a flow chart of a method in accordance with an embodiment of the disclosure.

Referring now to FIG. 5, while referencing components of FIGS. 1-4, FIG. 5 shows a flow chart of a method 500 in accordance with an embodiment of the disclosure. At block 502, communication is established between a mobile device 208 and a mobile wireless access point 204 associated with a car operating panel 202 within an elevator car 103. At block 504, one or more car operating panel commands are received from a mobile device user 209 at a user interface 257 of the mobile device 208. At block 506, the one or more car operating panel commands are transmitted to the car operating panel 202 through the mobile wireless access point 204. At block 508, status information is displayed on the user interface 257 based on data received from the car operating panel 202 through the mobile wireless access point 204. For example, upon selecting "Floor 5" as a desired destination floor (i.e., stop landing) through the user interface 257, the car operating panel 202 can send an acknowledgment back through the mobile wireless access point 204 which is displayed on the user interface 257 indicating that "Floor 5" is now one of the selected stop landings as the elevator car 103 traverses through the elevator shaft 117 of FIG. 1. In embodiments, the application 255 may not require registration or permissions for use; rather, only a physical presence of the mobile device 208 within the elevator car 103 may be used to confirm that commands from the mobile device 208 can be accepted by the car operating panel 202.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method comprising:
   establishing communication between a mobile device and a mobile wireless access point associated with a car operating panel within an elevator car;
   providing a user interface on the mobile device operable to command the car operating panel through the mobile wireless access point;
   determining a proximity between the mobile device and the car operating panel;
   registering a car call to command a stop landing of the elevator car based on verifying the proximity of the mobile device to the car operating panel within a threshold distance and an input through the user interface on the mobile device indicating the stop landing; and
   disabling communication between the mobile device and the car operating panel based on determining that the mobile device is external to the elevator car.

2. The method of claim 1, wherein the proximity between the mobile device and the car operating panel is determined based on a signal strength between the mobile device and the car operating panel.

3. The method of claim 1, wherein the proximity between the mobile device and the car operating panel is determined based on tracking movement of the mobile device within the elevator car.

4. The method of claim 1, wherein the proximity between the mobile device and the car operating panel is determined based on a beacon operably coupled to the mobile wireless access point and configured to communicate with the mobile device.

5. The method of claim 1, wherein the proximity between the mobile device and the car operating panel is determined based on a triangulation between the mobile device, the car operating panel, and at least one more wireless communication source.

6. The method of claim 5, wherein the at least one more wireless communication source comprises another instance of the car operating panel within the elevator car.

7. The method of claim 5, wherein the at least one more wireless communication source comprises a beacon operably coupled to the mobile wireless access point and configured to communicate with the mobile device.

8. The method of claim 1, wherein the user interface on the mobile device is operable to receive one or more car operating panel commands, transmit the one or more car operating panel commands to the car operating panel, and display status information received from the car operating panel.

9. The method of claim 1, wherein communication between the mobile device and the mobile wireless access point comprises local wireless communication within a wireless communication range of the mobile device and the mobile wireless access point.

10. A system comprising:
    a car operating panel in an elevator car, the car operating panel operable to control a plurality of actions of the elevator car; and
    a mobile wireless access point operably coupled to the car operating panel, the mobile wireless access point comprising a short-range communication module and a controller configured to perform:
    establishing communication between a mobile device and the mobile wireless access point through the short-range communication module;
    determining a proximity between the mobile device and the car operating panel;
    registering a car call to command a stop landing of the elevator car based on verifying the proximity of the mobile device to the car operating panel within a threshold distance and an input through the mobile device indicating the stop landing; and
    disabling communication between the mobile device and the car operating panel based on determining that the mobile device is external to the elevator car.

11. The system of claim 10, wherein the proximity between the mobile device and the car operating panel is determined based on a signal strength between the mobile device and the car operating panel.

12. The system of claim 10, wherein the proximity between the mobile device and the car operating panel is determined based on tracking movement of the mobile device within the elevator car.

13. The system of claim 10, further comprising a beacon operably coupled to the mobile wireless access point and configured to communicate with the mobile device, wherein the proximity between the mobile device and the car operating panel is determined based on communication through the beacon.

14. The system of claim 10, wherein the proximity between the mobile device and the car operating panel is determined based on a triangulation between the mobile device, the car operating panel, and at least one more wireless communication source.

15. The system of claim 14, wherein the at least one more wireless communication source comprises another instance of the car operating panel within the elevator car.

16. The system of claim 14, wherein the at least one more wireless communication source comprises a beacon operably coupled to the mobile wireless access point and configured to communicate with the mobile device.

17. The system of claim 10, wherein communication between the mobile device and the mobile wireless access point comprises local wireless communication within a wireless communication range of the mobile device and the mobile wireless access point.

18. A method comprising:
    establishing communication between a mobile device and a mobile wireless access point associated with a car operating panel within an elevator car;
    receiving one or more car operating panel commands at a user interface of the mobile device;
    transmitting the one or more car operating panel commands to the car operating panel through the mobile wireless access point;
    displaying status information on the user interface based on data received from the car operating panel through the mobile wireless access point; and
    disabling communication between the mobile device and the car operating panel based on determining that the mobile device is external to the elevator car.

19. The method of claim 1, further comprising:
    providing, on the mobile device, current selection/status information that is visible on the car operating panel; and
    providing, on the mobile device, additional status information beyond that available directly through the car operating panel.

20. The system of claim 10, wherein the mobile device is configured to provide current selection/status information that is visible on the car operating panel and provide additional status information beyond that available directly through the car operating panel.

* * * * *